(12) United States Patent
Wakabayashi et al.

(10) Patent No.: US 11,495,816 B2
(45) Date of Patent: Nov. 8, 2022

(54) METHODS FOR PRODUCING LIQUID COMPOSITION, POLYMER ELECTROLYTE MEMBRANE, CATALYST LAYER, AND MEMBRANE/ELECTRODE ASSEMBLY

(71) Applicant: AGC Inc., Chiyoda-ku (JP)

(72) Inventors: Hirokazu Wakabayashi, Chiyoda-ku (JP); Satoru Hommura, Chiyoda-ku (JP); Atsuyoshi Takenaka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 192 days.

(21) Appl. No.: 15/714,419

(22) Filed: Sep. 25, 2017

(65) Prior Publication Data

US 2018/0013159 A1 Jan. 11, 2018

Related U.S. Application Data

(63) Continuation of application No. PCT/JP2016/060956, filed on Apr. 1, 2016.

(30) Foreign Application Priority Data

Apr. 6, 2015 (JP) .............................. JP2015-077515

(51) Int. Cl.
*H01M 4/86* (2006.01)
*H01M 4/88* (2006.01)
(Continued)

(52) U.S. Cl.
CPC ....... *H01M 8/1072* (2013.01); *H01M 4/8668* (2013.01); *H01M 4/8828* (2013.01);
(Continued)

(58) Field of Classification Search
CPC ............. H01M 8/1072; H01M 4/8668; H01M 8/1051; H01M 8/1023; H01M 8/1039;
(Continued)

(56) References Cited

U.S. PATENT DOCUMENTS 9,379,403 B2 * 6/2016 Hommura ........... H01M 8/1023
2006/0019140 A1 * 1/2006 Kawazoe ................ C08J 3/212
521/27
(Continued)

FOREIGN PATENT DOCUMENTS

JP 2-80053 3/1990
JP 2005-270835 10/2005
(Continued)

OTHER PUBLICATIONS

International Search Report dated Jul. 5, 2016 in PCT/JP2016/060956, filed on Apr. 1, 2016.

*Primary Examiner* — Christian Roldan
(74) *Attorney, Agent, or Firm* — Oblon, McClelland, Maier & Neustadt, L.L.P.

(57) ABSTRACT

A method for producing a liquid composition containing a fluoropolymer having sulfonic acid groups, trivalent cerium ions and water, by (1) irradiating a solution containing at least one cerium compound selected from cerium carbonate, cerium hydroxide and cerium oxide, the fluoropolymer and the water, with light at least partially in a wavelength region from 300 to 400 nm so that the ultraviolet irradiance on the surface of the solution is at least 0.1 mW/cm$^2$ or (2) adding a reducing agent to a solution containing at least one cerium compound selected from cerium carbonate, cerium hydroxide and cerium oxide, the fluoropolymer and the water.

8 Claims, 1 Drawing Sheet

(51) Int. Cl.

| | |
|---|---|
| *H01M 8/10* | (2016.01) |
| *H01M 8/1072* | (2016.01) |
| *H01M 8/1039* | (2016.01) |
| *H01M 8/1051* | (2016.01) |
| *H01M 8/1023* | (2016.01) |
| *H01M 8/1004* | (2016.01) |
| *H01M 8/1048* | (2016.01) |
| *H01M 8/1081* | (2016.01) |

(52) U.S. Cl.
 CPC ....... *H01M 8/1004* (2013.01); *H01M 8/1023* (2013.01); *H01M 8/1039* (2013.01); *H01M 8/1048* (2013.01); *H01M 8/1051* (2013.01); *H01M 8/1081* (2013.01); *H01M 2008/1095* (2013.01); *H01M 2300/0091* (2013.01); *Y02P 70/50* (2015.11)

(58) Field of Classification Search
 CPC ............. H01M 8/1081; H01M 8/1004; H01M 8/1048; H01M 4/8828; H01M 2300/0091; H01M 2008/1095; Y02P 70/56
 USPC .......................................................... 429/535
 See application file for complete search history.

(56) References Cited

U.S. PATENT DOCUMENTS

| | | | | |
|---|---|---|---|---|
| 2009/0110967 | A1* | 4/2009 | Hommura | C08J 5/2237 429/490 |
| 2009/0130518 | A1* | 5/2009 | Lee | H01M 4/921 502/101 |
| 2011/0212383 | A1* | 9/2011 | Kawazoe | H01M 8/1039 429/494 |
| 2013/0266886 | A1* | 10/2013 | Hatakeyama | B82Y 30/00 429/479 |
| 2013/0309596 | A1* | 11/2013 | Kawazoe | C08J 3/212 429/493 |
| 2015/0188175 | A1* | 7/2015 | Pearman | H01M 8/1004 429/480 |
| 2016/0197370 | A1* | 7/2016 | Kawazoe | B01D 69/141 429/409 |
| 2016/0293987 | A1* | 10/2016 | Okuyama | H01M 4/8828 |
| 2019/0067722 | A1* | 2/2019 | Kawazoe | H01M 4/8605 |

FOREIGN PATENT DOCUMENTS

| | | | |
|---|---|---|---|
| JP | 201518069 | * | 3/2015 |
| JP | 2016-108583 | | 6/2016 |
| WO | WO 2005/124912 A1 | | 12/2005 |
| WO | WO 2014/028636 A1 | | 2/2014 |

* cited by examiner

METHODS FOR PRODUCING LIQUID COMPOSITION, POLYMER ELECTROLYTE MEMBRANE, CATALYST LAYER, AND MEMBRANE/ELECTRODE ASSEMBLY

TECHNICAL FIELD

The present invention relates to a method for producing a liquid composition, and methods for producing a polymer electrolyte membrane, a catalyst layer and a membrane/electrode assembly by using the liquid composition.

BACKGROUND ART

A polymer electrolyte fuel cells is, for example, a stack of a plurality of cells, each comprising a membrane/electrode assembly sandwiched between two separators. The membrane/electrode assembly comprises an anode and a cathode each having a catalyst layer, and a polymer electrolyte membrane disposed between the anode and the cathode. The polymer electrolyte membrane and the catalyst layers contain a fluoropolymer having sulfonic acid groups, as an ion exchange resin.

As oxygen is reduced at the cathode of a polymer electrolyte fuel cell via hydrogen peroxide, hydrogen peroxide or peroxide radicals form at the cathode. Furthermore, as oxygen molecules can pass through the polymer electrolyte membrane from the cathode to the anode, hydrogen peroxide or peroxide radicals can form at the anode as well. Hydrogen peroxide or peroxide radicals formed at the cathode or the anode are known to deteriorate the fluoropolymer having sulfonic acid groups contained in the polymer electrolyte membrane and the catalyst layers.

A proposal to use the following liquid composition was made for formation of polymer electrolyte membranes and catalyst layers resistant to hydrogen peroxide or peroxide radicals.

A liquid composition comprising water, a fluoropolymer having sulfonic acid groups and trivalent or tetravalent cerium ions (Patent Document 1).

PRIOR ART DOCUMENTS

Patent Documents

Patent Document 1: WO 2005/124912

DISCLOSURE OF INVENTION

Technical Problem

However, the liquid composition contains tetravalent cerium ions as cerium (IV) hydroxide ($Ce(OH)_4$). Because cerium (IV) hydroxide has a low solubility in water, a liquid composition containing cerium (IV) hydroxide is whitish and clouded with cerium (IV) hydroxide particles. A liquid composition containing cerium (IV) hydroxide particles form polymer electrolyte membranes and catalyst layers with poor resistance.

Trivalent cerium ions could be used to avoid a liquid composition clouded with cerium (IV) hydroxide particles. However, even in the case of cerium (III) carbonate hydrate, for example, it partly contains tetravalent cerium resulting from oxidization by atmospheric oxygen. Therefore, after addition of cerium (III) carbonate hydrate to a solution containing water and a fluoropolymer having sulfonic acid groups, at least 100 days of stirring is needed to completely dissolve cerium (IV) hydroxide. Patent Document 1 discloses in paragraph [0055] that addition of 1 g of cerium (III) carbonate hydrate to a solution containing ethanol (42 mass %), water (28 mass %) and a fluoropolymer having sulfonic acid groups (30 mass %) followed by 8 hours of stirring gave a clear liquid composition. However, in reality, the liquid composition was almost clear but contained a trace of undissolved cerium (IV) hydroxide.

A recent study by the present inventors revealed that when a solution containing water and a fluoropolymer having sulfonic acid groups was shielded from light as in a mixing tank on an actual production line, even a month of stirring was not enough to dissolve cerium (IV) hydroxide after addition of cerium (III) carbonate hydrate to the solution.

The present invention provides a method for producing a liquid composition which is capable of eliminating clouding of a liquid with cerium (IV) hydroxide particles in a relatively short time, and methods for producing a polymer electrolyte membrane, a catalyst layer and a membrane/electrode assembly, each having excellent durability, in a relatively short time.

Solution to Problem

The present invention provides the following embodiments.

[1] A method for producing a liquid composition containing a fluoropolymer having sulfonic acid groups, trivalent cerium ions and water, which comprises irradiating a solution containing at least one cerium compound selected from the group consisting of cerium carbonate, cerium hydroxide and cerium oxide, the fluoropolymer and the water, with light at least partially in a wavelength region from 300 to 400 nm so that the ultraviolet irradiance on the surface of the solution is at least $0.1$ $mW/cm^2$.

[2] The method for producing a liquid composition according to [1], wherein the light comes from a light source having a dominant wavelength within a range of from 300 to 400 nm.

[3] A method for producing a liquid composition containing a fluoropolymer having sulfonic acid groups, trivalent cerium ions and water, which comprises adding a reducing agent to a solution containing at least one cerium compound selected from the group consisting of cerium carbonate, cerium hydroxide and cerium oxide, the fluoropolymer and the water.

[4] The method for producing a liquid composition according to [3], wherein the reducing agent is at least one member selected from the group consisting of hydrogen peroxide, acetaldehyde, formic acid and oxalic acid.

[5] The method for producing a liquid composition according to [3] or [4], wherein the reducing agent is added in amount of from 0.47 to 90 mol % relative to elemental cerium (100 mol %) in the cerium compound.

[6] The method for producing a liquid composition according to any one of [1] to [5], wherein the content of the fluoropolymer having sulfonic acid groups in the liquid composition (100 mass %) is from 1 to 50 mass %.

[7] The method for producing a liquid composition according to any one of [1] to [6], wherein the content of the water in the liquid composition (100 mass %) is from 20 to 60 mass %.

[8] The method for producing a liquid composition according to any one of [1] to [7], wherein the content of trivalent cerium ions is from 1.6 to 23.3 equivalents relative to the sulfonic acid groups in the fluoropolymer (100 equivalents).

[9] The method for producing a liquid composition according to any one of [1] to [8], wherein the liquid composition further contains an organic solvent having a hydroxyl group.

[10] The method for producing a liquid composition according to any one of [1] to [9], wherein the proportion of the organic solvent having a hydroxyl group to the sum of the water and the organic solvent having a hydroxyl group (100 mass %) is from 1 to 90 mass %.

[11] A method for producing a polymer electrolyte membrane for a polymer electrolyte fuel cell, which comprises obtaining a liquid composition by the method as defined in any one of [1] to [10], and then forming a polymer electrolyte membrane for a polymer electrolyte fuel cell by using the liquid composition.

[12] A method for producing a catalyst layer for at least one of the cathode and the anode of a polymer electrolyte fuel cell, which comprises obtaining a liquid composition by the method as defined in any one of [1] to [10], mixing the liquid composition and a catalyst to obtain a catalyst layer forming coating solution and forming the catalyst layer by using the liquid composition.

[13] A method for producing a membrane/electrode assembly comprising an anode having a catalyst layer, a cathode having a catalyst layer and a polymer electrolyte membrane disposed between the anode and the cathode, which comprises at least one of the following steps ($\alpha$) and ($\beta$):

step ($\alpha$): producing a liquid composition by the method as defined in any one of [1] to [10] and producing the polymer electrolyte membrane by using the liquid composition;

step ($\beta$): producing a liquid composition by the method as defined in any one of [1] to [10], preparing a catalyst layer forming coating solution by mixing the liquid composition and a catalyst, and producing the catalyst layer of at least one of the cathode and the anode by using the catalyst layer forming coating solution.

Advantageous Effects of Invention

The method for producing a liquid composition of the present invention is capable of eliminating clouding of a liquid with cerium (IV) hydroxide particles in a relatively short time.

The methods for producing a polymer electrolyte membrane, a catalyst layer and a membrane/electrode assembly of the present invention can produce electrolyte membranes, catalyst layers and membranes and membrane/electrode assemblies, each having excellent durability, in a relatively short time.

DESCRIPTION OF EMBODIMENTS

Figure 1:
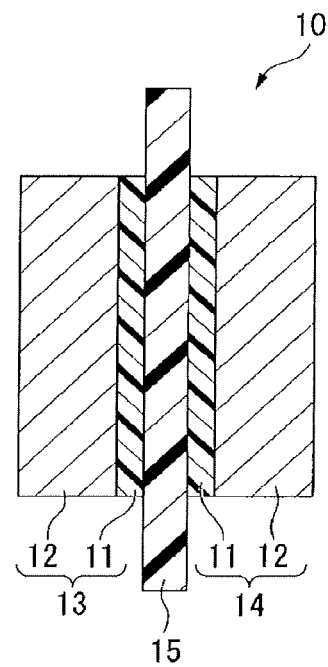
FIG. 1 is a schematic sectional view showing an example of a membrane/electrode assembly for polymer electrolyte fuel cells.

The following definitions of terms apply throughout the specification including claims.

A "polymer" means a compound having a structure composed of a plurality of structural units.

A "fluoropolymer" means a polymer wherein some or all of hydrogen atoms bonded to carbon atoms are substituted by fluorine atoms.

A "structural unit" means a unit derived from a monomer, formed by polymerization of the monomer. The structural unit may be a unit directly formed by the polymerization reaction of the monomer, or may be a unit having part of such a unit converted to another structure by treating the polymer. Structural units represented by the formula (U1) will be referred to as units (U1). Structural units represented by other formulae will be referred to in the same manner.

A "monomer" means a compound having a polymerizable carbon-carbon double bond. A monomer represented by the formula (M1) be referred to as a monomer (M1). Monomers represented by other formulae will be referred to in the same manner.

A "sulfonic acid group" includes —$SO_3^-H^+$ and —$SO_3^-M^+$ (where $M^+$ is a monovalent metal ion, or an ammonium ion wherein one or more hydrogen atoms may be substituted by a hydrocarbon group).

An "ultraviolet irradiance (mW/cm$^2$) on the surface of the solution" is obtained by calculating the ultraviolet power of the light source having a wavelength of from 300 to 400 nm by multiplying the irradiance at a certain distance from the light source by the square of the distance and then dividing the ultraviolet output power by the square of the distance between the light source and the surface of the solution.

<Liquid Composition>

The liquid composition of the present invention is used for formation of a polymer electrolyte membrane or a catalyst layer of a polymer electrolyte fuel cell.

The liquid composition of the present invention contains a fluoropolymer having sulfonic acid groups, trivalent cerium ions and water. The liquid composition of the present invention may further contain an organic solvent having a hydroxyl group.

(Fluoropolymer Having Sulfonic Acid Groups)

The fluoropolymer having sulfonic acid groups may be in the acid form having H$^+$ as the cations of the sulfonic acid groups or in the salt form having metal ions, ammonium ions or the like as the cations. The fluoropolymer having sulfonic acid groups in a polymer electrolyte membrane or a catalyst layer is usually in the acid form. Some of the cations of the sulfonic acid groups may be replaced by bivalent or higher metal ions.

The fluoropolymer having sulfonic acid groups is preferably a perfluoropolymer wherein all hydrogen atoms bonded to carbon atoms are substituted by fluorine atoms from the viewpoint of excellent chemical durability.

The perfluoropolymer having sulfonic acid groups may be a polymer (H), which will be discussed later, a polymer (Q), which will be discussed later, or such a known polymer having sulfonic acid groups and structural units derived from a perfluoromonomer having a 5-membered ring as disclosed in WO2011/013577. A polymer (H) or a polymer (Q) is preferred in view of easy availability and production.

Polymer (H):

The polymer (H) is a polymer containing units (U1) (other than the polymer (Q)).

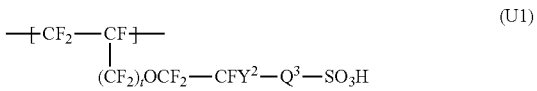

In the formula (U1), $Q^3$ is a single bond or a perfluoroalkylene group which may have an etheric oxygen atom, $Y^2$ is a fluorine atom or a monovalent perfluoro organic group, and t is 0 or 1. The single bond means that the carbon atom of $CFY^2$ and the sulfur atom of $SO_3H$ are directly bonded. The monovalent perfluoro organic group means a group containing one or more carbon atoms.

The number of etheric oxygen atoms, if any, in the perfluoroalkylene group as $Q^3$ may be 1 or more. Further, such an oxygen atom may be inserted in a carbon atom/carbon atom bond of the perfluoroalkylene group or may be bonded to a terminal carbon atom. The fluoroalkylene group may be linear or branched. The number of carbon atoms in the perfluoroalkylene group is preferably from 1 to 6, more preferably from 1 to 4.

$Y^2$ is preferably a fluorine atom or a trifluoromethyl group.

As the unit (U1), unit (U1-1) is preferred, and unit (U1-11), unit (U1-12), unit (U1-13) or unit (U1-14) is more preferred because production of the polymer (H) is easy, and industrial application is easy.

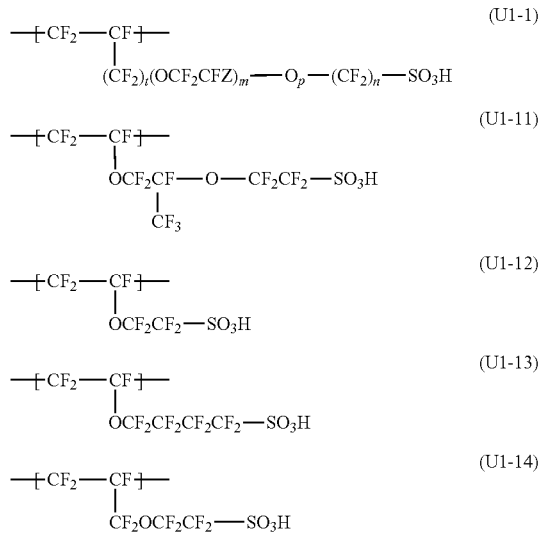

In the formula (U1-1), Z is a fluorine atom or a trifluoromethyl group, m is an integer of from 0 to 3, n is an integer of from 1 to 12, p is 0 or 1, and m+p>0.

The polymer (H) may further have structural units derived from other monomers (hereinafter referred to as other units). The proportion of such other units is properly adjusted so that the ion exchange capacity of the polymer (H) is within a preferred range described hereinafter.

Such other units are preferably structural units derived from a perfluoromonomer, more preferably structural units derived from tetrafluoroethylene (hereinafter referred to as TFE), in view of the mechanical strength and the chemical durability.

The polymer (H) can be produced by polymerizing a compound (M1) and another monomer as the case requires to obtain a precursor polymer, and converting the —$SO_2F$ groups in the precursor polymer to sulfonic acid groups. The conversion of —$SO_2F$ groups to sulfonic acid groups is carried out by hydrolysis or treatment for conversion to the acid form.

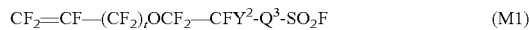

Polymer (Q):
Polymer (Q) is a polymer having units (U2).

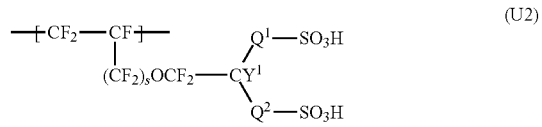

In the formula (U2), $Q^1$ is a perfluoroalkylene group which may contain an etheric oxygen atom, $Q^2$ is a single bond or a perfluoroalkylene group which may contain an etheric oxygen atom, $Y^1$ is a fluorine atom or a monovalent perfluoro organic group, and s is 0 or 1. The single bond means that the carbon atom of $CFY^2$ and the sulfur atom of $SO_3H$ are directly bonded. The monovalent perfluoro organic group means a group containing one or more carbon atoms.

The number of etheric oxygen atoms, if any, in the perfluoroalkylene group as $Q^1$ or $Q^2$ may be 1 or more. Further, such an oxygen atom may be inserted in a carbon atom/carbon atom bond of the perfluoroalkylene group or may be bonded to a terminal carbon atom. The fluoroalkylene group may be linear or branched, preferably linear. The number of carbon atoms in the perfluoroalkylene group is preferably from 1 to 6, more preferably from 1 to 4. When the number of carbon atoms is at most 6, the fluoromonomer to be used as a starting monomer tends to have a low boiling point and is easy to purify by distillation.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability of the power generation performance will be obtained when a polymer electrolyte fuel cell is operated for a long period of time, as compared with a case where $Q^2$ is a single bond.

It is preferred that at least one of $Q^1$ and $Q^2$ is a $C_{1-6}$ perfluoroalkylene group having an etheric oxygen atom. A fluoropolymer having an etheric oxygen atom can be prepared without a fluorination reaction with a fluorine gas, and hence can be produced easily in a good yield.

$Y^1$ is preferably a fluorine atom or a $C_{1-6}$ linear perfluoroalkyl group which may have an etheric oxygen atom.

The unit (U2) is preferably unit (U2-1), and in view of easy production of the polymer (Q) and easy industrial application, it is more preferably unit (U2-11), unit (U2-12) or unit (U2-13).

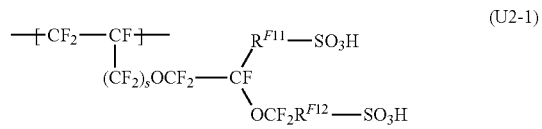

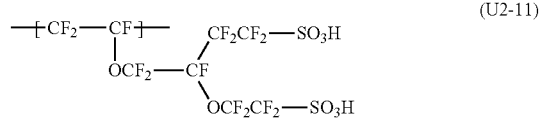

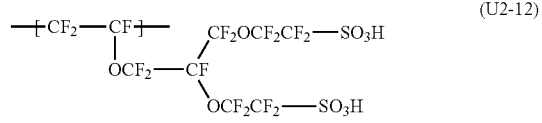

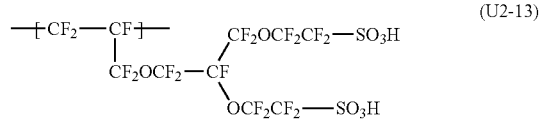

In the formula (U2-1), $R^{F11}$ is a single bond or a $C_{1-6}$ linear perfluoroalkylene group which may have an etheric oxygen atom, and $R^{F12}$ is a $C_{1-6}$ linear perfluoroalkylene group.

The polymer (Q) may further have other units. The proportion of such other units is properly adjusted so that the ion exchange capacity of the polymer (Q) is within the preferred range described hereinafter.

Such other units are preferably units derived from a perfluoromonomer, more preferably units derived from TFE, in view of the mechanical strength and the chemical durability.

The polymer (H2) can be produced, for example, as disclosed in WO2007/013533 or the like.

The ion exchange capacity of the polymer (Q) is preferably from 0.5 to 2.0 meq/g dry resin, more preferably from 0.8 to 1.5 meq/g dry resin, in view of electric conductivity and gas permeability.

(Trivalent Cerium Ions)

As the liquid composition of the present invention contains trivalent cerium ions, some of the cations in the fluoropolymer having sulfonic groups are ion-exchanged with cerium ions, and thereby in polymer electrolyte membranes and catalyst layers, deterioration of the fluoropolymer by hydrogen peroxide or peroxide radicals can be effectively prevented.

(Organic Solvent Having a Hydroxyl Group)

The organic solvent having a hydroxyl group may be methanol, ethanol, 1-propanol, 2-propanol, 2,2,2-trifluoroetyanol, 2,2,3,3,3-pentafluoro-1-propanol, 2,2,3,3-tetrafluoro1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6-nonafluoro-1-hexanol, 3,3,4,4,5,5,6,6,7,7,8,8,8-tridecafluoro-1-octanol or the like.

As the organic solvent having a hydroxy group, one type may be used alone, or two or more types may be used as mixed.

(Composition of the Liquid Composition)

The proportion of the fluoropolymer having sulfonic acid groups is preferably from 1 to 50 mass %, more preferably from 3 to 30 mass %, in the liquid composition (100 mass %).

The content of trivalent cerium ions relative to the sulfonic acid groups (100 equivalents) in the fluoropolymer is preferably from 1.6 to 23.3 equivalents, more preferably from 2 to 16.7 equivalents, further preferably from 2 to 10 equivalents. When the content of trivalent cerium ions is at or above the lower limits of the above-mentioned ranges, it is possible to prevent the deterioration of the fluoropolymer by hydrogen peroxide or peroxide radicals sufficiently. When the content of cerium ions is at or below the upper limits of the above-mentioned ranges, because a lower proportion of protons in the fluoropolymer will be exchanged, it is possible to sufficiently secure the proton conductivity of the polymer electrolyte membrane and the catalyst layers.

The proportion of water is preferably from 20 to 60 mass %, more preferably from 20 to 55 mass %, in the liquid composition (100 mass %).

When the liquid composition contains an organic solvent having a hydroxyl group, the proportion of water is preferably from 10 to 99 mass %, more preferably from 40 to 99 mass %, relative to the sum of water and the organic solvent having a hydroxyl group (100 mass %). By increasing the proportion of water, it is possible to improve the dispersibility of the fluoropolymer.

When the liquid composition contains an organic solvent having a hydroxyl group, the proportion of the organic solvent having a hydroxyl group is preferably from 1 to 90 mass %, more preferably from 1 to 60 mass %, relative to the sum of water and the organic solvent having a hydroxyl group (100 mass %).

<Production of the Liquid Composition>

The liquid composition of the present invention is produced preferably by either the following method (1) or (2).

(Method (1))

The method (1) comprises irradiating a solution containing a cerium compound, a fluoropolymer having sulfonic acid groups and water with light at least partially in a wavelength regions from 300 to 400 nm so that the ultraviolet irradiance on the surface of the solution is at least 0.1 mW/cm².

The solution may contain an organic solvent having a hydroxyl group.

The cerium compound is at least one selected from the group consisting of cerium carbonate, cerium hydroxide and cerium oxide. The cerium in the cerium compound may be trivalent or tetravalent.

Upon addition to a solution containing water, cerium carbonate, cerium hydroxide or cerium oxide generates cerium (IV) hydroxide in the solution. Under irradiation of the cerium (IV) hydroxide in the solution containing water with ultraviolet light, hydrogen peroxide is formed from water in the solution and acts as a reducing agent for tetravalent cerium ions.

The irradiation light is at least partly in a wavelength region from 300 to 400 nm, namely contains ultraviolet radiation, preferably from a light source with the dominant wavelength of from 300 to 400 nm, particularly from 325 to 365 nm, in view of efficient production of hydrogen peroxide.

The ultraviolet irradiance on the surface of the solution is at least 0.1 mW/cm² preferably at least 0.3 mW/cm², more preferably at least 1.5 mW/cm², further preferably at least 2 mW/cm², particularly preferably at least 3 mW/cm². The ultraviolet irradiance is usually at most 100 mW/cm², preferably at most 50 mW/cm². When the ultraviolet irradiance on the surface of the solution is at or above the above-mentioned lower limits, hydrogen peroxide is generated in large amounts in a short time.

In the method (1), because the solution containing cerium (IV) hydroxide and water is irradiated with light containing ultraviolet radiation at an ultraviolet irradiance of at least 0.1 mW/cm² on the surface of the solution, hydrogen peroxide is generated in large amounts in a short time. The hydrogen peroxide reduces cerium (IV) hydroxide to trivalent cerium ions in a short time. As a result, the solution slouded with cerium (IV) hydroxide particles clears in a relatively short time.

(Method (2))

The method (2) comprises adding a reducing agent to a solution containing a cerium compound, a fluoropolymer having sulfonic acid groups and water. The solution may contains an organic acid having a hydroxyl group.

The cerium compound is at least one selected from the group consisting of cerium carbonate, cerium hydroxide and cerium oxide. The cerium in the cerium compound may be trivalent or tetravalent.

Upon addition of cerium carbonate, cerium hydroxide or cerium oxide to a solution containing water, cerium (IV) hydroxide forms in the solution. The reducing agent added to the solution reduces cerium (IV) hydroxide to trivalent cerium ions promptly.

The reducing agent may be any compound as long as it reduces cerium (IV) hydroxide to trivalent cerium ions. The reducing agent is preferably a compound which has little effect even if it remains in the liquid composition or which decomposes promptly even if it remains in the liquid composition. Specifically, at least one species selected from the group consisting of hydrogen peroxide, acetaldehyde, formic acid and oxalic acid is preferred, and hydrogen peroxide is more preferred.

The reducing agent is added preferably in an amount of from 0.47 to 90 mol %, more preferably from 0.7 to 80 mol %, further preferably from 1 to 23 mol %, relative to the elemental cerium (100 mol %) in the cerium compound. When the amount of the reducing agent is at or above the lower limits of the above-mentioned ranges, cerium (IV) hydroxide is reduced to trivalent cerium ions in a short time. When the amount of the reducing agent is at or below the upper limits of the above-mentioned ranges, the amount of the reducing agent remaining in the liquid composition is small.

In the method (2), the reducing agent added to the solution containing cerium (IV) hydroxide and water reduces cerium (IV) hydroxide to trivalent cerium ions promptly, and thereby the solution clouded with cerium (IV) hydroxide particles clears in a relatively short time.

<Membrane/Electrode Assembly>

FIG. 1 shows a schematic sectional view of an example of a membrane/electrode assembly for polymer electrolyte fuel cells. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in contact with the catalyst layers 11.

(Catalyst Layers)

The catalyst layer 11 contains a catalyst and a fluoropolymer having sulfonic acid groups.

The catalyst may, for example, be a supported catalyst having platinum or a platinum alloy supported on a carbon carrier.

The carbon carrier may be carbon black powder.

The catalyst layer 11 may contain a water repellent agent, since the effect of suppressing flooding is thereby enhanced. The water repellent agent may, for example, be a tetrafluoroethylene-hexafluoropropylene copolymer, a tetrafluoroethylene-perfluoro(alkyl vinyl ether) copolymer, or polytetrafluoroethylene. As the water repellent agent, a fluoropolymer soluble in a solvent is preferred, since the catalyst layer 11 can be made water repellent by an easy treatment. The amount of the water repellent agent is preferably from 0.01 to 30 mass % in the catalyst layer 11 (100 mass %).

(Gas Diffusion Layers)

The gas diffusion layer 12 has a function to uniformly diffuse gas through the catalyst layer 11 and a function as a current collector. The gas diffusion layer 12 may, for example, be carbon paper, carbon cloth or carbon felt. The gas diffusion layer 12 is preferably made water repellent by treatment with e.g. polytetrafluoroethylene.

(Carbon Layer)

Figure 2:
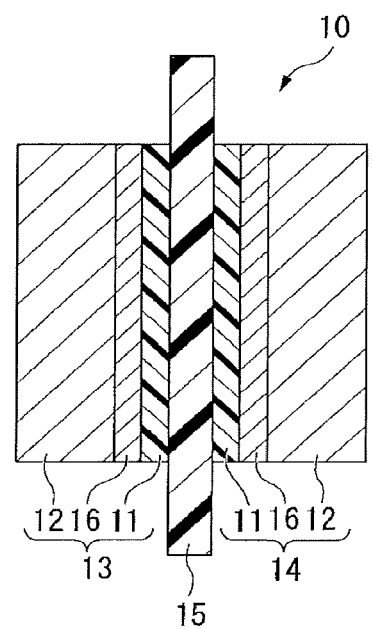
FIG. 2 is a schematic sectional view showing another example of a membrane/electrode assembly for a polymer electrolyte fuel cells.

The membrane/electrode assembly 10 may have a carbon layer 16 between the catalyst layer 11 and the gas diffusion layer 12, as shown in FIG. 2. By disposing the carbon layer 16, it is possible to improve the gas diffusion property on the surface of the catalyst layer 11 and to substantially improve the power generation performance of the polymer electrolyte fuel cell.

The carbon layer 16 is a layer containing carbon and a nonionic fluoropolymer.

The carbon is preferably a carbon nanofiber having a diameter of from 1 to 1,000 nm and a fiber length of at most 1,000 μm.

The nonionic fluoropolymer may, for example, be polytetrafluoroethylene.

(Polymer Electrolyte Membrane)

The polymer electrolyte membrane 15 is a membrane containing a fluoropolymer having sulfonic acid groups.

The polymer electrolyte membrane 15 may be reinforced with a reinforcing material. As the reinforcing material, porous materials, fibers, woven fabrics, nonwoven fabrics, etc. may be mentioned. As the material for the reinforcing material, polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide, etc. may be mentioned.

<Method for Producing a Polymer Electrolyte Membrane>

The method for producing a polymer electrolyte membrane of the present invention comprises the following steps (α1) and (α2).

Step (α1): obtaining a liquid composition by the method for producing a liquid composition of the present invention; and Step (α2): forming a polymer electrolyte membrane for a polymer electrolyte fuel cell by using the liquid composition.

(Step (α1))

A clear liquid composition is obtained by the above-mentioned method (1) or (2). The turbidity of the liquid composition is preferably at most 1 NTU, more preferably at most 0.8 NTU. When the turbidity is at or below the upper limits of the above-mentioned ranges, a more durable polymer electrolyte membrane is obtained. The turbidity can be measured by the method described in the Examples.

(Step (α2))

The polymer electrolyte membrane may be formed, for example, by a method (casting method) of applying the liquid composition onto a substrate film or a catalyst layer, followed by drying.

It is preferred to carry out annealing t to stabilize the polymer electrolyte membrane. The annealing temperature is preferably from 130 to 200° C., more preferably from 140 to 160° C., though it depends on the kind of the fluoropolymer having sulfonic acid groups. When the annealing temperature is at 130° C. or above, the fluoropolymer having sulfonic acid groups does not hydrate excessively. At an annealing temperature of 200° C. or below, thermal decomposition of sulfonic acid groups can be suppressed.

In the above-mentioned method for producing a polymer electrolyte membrane of the present invention, because the liquid composition is obtained in a short time without clouding with cerium (IV) hydroxide by the method for producing a liquid composition of the present invention, a polymer electrolyte membrane can be produced in a relatively short time without damage to durability by cerium (IV) hydroxide.

<Method for Producing a Catalyst Layer>

The method for producing a catalyst layer of the present invention preferably comprises the following steps (β1) to (β3).

Step (β1): obtaining a liquid composition by the method for producing a liquid composition of the present invention;

Step (β2): mixing the liquid composition and a catalyst to obtain a catalyst layer forming coating solution; and Step (β3): forming the catalyst layer by using the catalyst layer forming coating solution.

(Step (β1))

A liquid composition without clouding is obtained by the above-mentioned method (1) or (2). The turbidity of the liquid composition is preferably at most 1 NTU, more preferably at most 0.8 NTU. When the turbidity is at or below the upper limits of the above-mentioned ranges, a more durable catalyst layer is obtained.

(Step (β2))

The catalyst layer forming coating solution is prepared, for example, by mixing the liquid composition and a dispersion of a catalyst.

(Step (β3))

The catalyst layer forming coating solution prepared by mixing the liquid composition of the present invention and a catalyst is used when a catalyst layer is formed for at least one of the cathode and the anode. The catalyst layer forming coating solution prepared by mixing the liquid composition of the present invention and a catalyst is used preferably to form a catalyst layer for the cathode, more preferably to form catalyst layers for the cathode and the anode.

The catalyst layers may be formed, for example, by the following methods.

(1) a method which comprises applying a catalyst layer forming coating solution onto a polymer electrolyte membrane, a gas diffusion layer or a carbon layer, followed by drying.

(2) a method which comprises applying a catalyst layer forming coating solution onto a substrate film, followed by drying to form a catalyst layer, and transferring the catalyst layer onto a polymer electrolyte membrane.

In the above-mentioned method for producing a catalyst layer of the present invention, because the liquid composition is obtained in a short time without clouding with cerium (IV) hydroxide by the method for producing a liquid composition of the present invention, a catalyst layer can be produced in a relatively short time without damage to durability by cerium (IV) hydroxide.

<Method for Producing a Membrane/Electrode Assembly>

When the membrane/electrode assembly has no carbon layer, the membrane/electrode assembly is produced, for example, by the following methods.

(1) a method which comprises forming catalyst layers on a polymer electrolyte membrane to form a membrane/catalyst layer assembly, and sandwiching the membrane/catalyst layer assembly between gas diffusion layers.

(2) a method which comprises forming catalyst layers on gas diffusion layers to form electrodes (an anode and a cathode) and sandwiching a polymer electrolyte membrane between the electrodes.

When the membrane/electrode assembly has a carbon layer, the membrane/electrode assembly is produced, for example, by the following methods.

(1) a method which comprises applying a dispersion containing carbon and a nonionic fluoropolymer onto substrate films, followed by drying to form carbon layers, forming catalyst layers on the carbon layers, then bonding the catalyst layers and a polymer electrolyte membrane, followed by peeling off the substrate films to obtain a membrane/catalyst layer assembly having carbon layers, and sandwiching the membrane/catalyst layer assembly between gas diffusion layers.

(2) a method which comprises applying dispersion containing carbon and a nonionic fluoropolymer onto gas diffusion layers, followed by drying to form carbon layers, and sandwiching a membrane/catalyst layer assembly having catalyst layers formed on a polymer electrolyte membrane, between the gas diffusion layers having carbon layers.

In the present invention, the liquid composition of the present invention is used to form at least one member selected from the group consisting of the polymer electrolyte membrane, the catalyst layer of the cathode and the catalyst layer of the anode.

Namely, the method for producing a membrane/electrode assembly of the present invention comprises at least one of the following steps (α) and (β).

Step (α): production of a polymer electrolyte membrane, which comprises the above-mentioned steps (α1) and (α2);

Step (β): production of the catalyst layer of at least one of the cathode and the anode, which comprises the above-mentioned steps (β1) to (β6).

In the above-mentioned method for producing a membrane/electrode assembly of the present invention, because the liquid composition is obtained in a short time without clouding with cerium (IV) hydroxide by the method for producing a liquid composition of the present invention, a membrane/electrode assembly can be produced in a relatively short time without damage to durability by cerium (IV) hydroxide.

<Polymer Electrolyte Fuel Cell>

By disposing a separator having grooves formed as gas flow paths, on both sides of the membrane/electrode assembly, a polymer electrolyte fuel cell is obtained.

The separator may be a separator made of various conductive material, such as a metal separator, a carbon separator, or a separator made of a mixture of graphite and a resin.

In the polymer electrolyte fuel cell, power generation is carried out by supplying a gas containing oxygen to the cathode, and a gas containing hydrogen to the anode.

Further, the membrane/electrode assembly can be applied also to a methanol fuel cell for generating electric power by supplying methanol to the anode.

EXAMPLES

Now, the present invention will be described in detail with reference to Examples, but the present invention is by no means limited by these Examples.

Ex. 1 to 14, and Ex. 18 to 20 are Examples of the present invention, and Ex. 15 to 17 are Comparative Examples.

(Determination of Hydrogen Peroxide)

A Ti-TPyp reagent {an acidic aqueous solution of oxo(5, 10, 15, 20-tetra-4-pyridyl-porphyrin)titanium (IV), TiO(tpypH$_4$)$^{4+}$ complex reacts with hydrogen peroxide to form a peroxocomplex, {TiO$_2$(tpypH$_4$)$^{4+}$}. The hydrogen peroxide concentration of a solution was determined by using the fact that the absorption (at 450 nm) by the complex, which has a molar absorption coefficient (ε) of $1.1 \times 10^5$ M$^{-1}$ cm$^{-1}$, is proportional to the hydrogen peroxide concentration.

(Turbidity)

The turbidity of a liquid composition was measured with an instrument complying with the asymmetry transmitting scattered light method prescribed in ISO 7027. The measured value can be used as a measure of dissolved cerium, and the lower the turbidity, the less the liquid composition is clouded (with cerium (IV) hydroxide). Specifically speaking, turbidity was measured with a turbidimeter (Lacombe Co., TN100IR) after filling the vial for the turbidimeter with a liquid composition to the marked line.

(Light Source)

Light source (L1): Handheld UV lamp (Funakoshi Co., Ltd., UVL-56, Lamp specifications: dominant wavelength:

365 nm, irradiance at a distance of 7.6 cm: 1.35 mW/cm$^2$). The ultraviolet output power of the light source (L1) is calculated at about 78 W from 1.35 mW/cm$^2$×(7.6 cm)$^2$.

Light source (L2): Handheld UV lamp (Funakoshi Co., Ltd., UVL-57, Lamp specifications: dominant wavelength: 302 nm, irradiance at a distance of 7.6 cm: 1.5 mW/cm$^2$). The ultraviolet output power of the light source (L2) is calculated at about 87 W from 1.5 mW/cm$^2$×(7.6 cm)$^2$.

Light source (L3): Fluorescent lamp (Panasonic Corporation, Palook EFD22EN, 22 W, wavelength range at least partially from 300 to 400 nm. Irradiance at a distance of 7.6 cm: 0.005 mW/cm$^2$). The ultraviolet output power of the light source (L3) is calculated at about 0.3 W from 0.005 mW/cm$^2$×(7.6 cm)$^2$.

(Fluoropolymer Solution)

Fluoropolymer Solution (S1):

A solution of a fluoropolymer having sulfonic acid groups (Flemion EW800 (ASAHI GLASS, Co., LTD., registered trademark), a polymer containing units derived from TFE and units (represented by the formula (U1-11)) and having an ion exchange capacity of 1.25 meq/g dry resin) in a solvent mixture of water:ethanol=40:60 (mass ratio) with a 26% solid content.

Fluoropolymer Solution (S2):

A solution of a fluoropolymer having sulfonic acid groups (Flemion EW800 (ASAHI GLASS, Co., LTD., registered trademark), a polymer containing units derived from TFE and units (represented by the formula (U1-11)) and having an ion exchange capacity of 1.43 meq/g dry resin) in a solvent mixture of water:ethanol=50:50 (mass ratio) with a 20% solid content.

Fluoropolymer Solution (S3):

300 g of a fluoropolymer having sulfonic acid groups (a polymer containing units derived from TFE and units (represented by the formula (U1-11)) and having an ion exchange capacity of 1.1 meq/g dry resin)), 475 g of ethanol and 316 g of water were leaded into a 2 L autoclave and stirred at 105° C. with a double helical impeller in a sealed state to obtain a homogeneous solution (solid content: 27.5 mass %).

Fluoropolymer Solution (S4):

300 g of a fluoropolymer having sulfonic acid groups (a polymer containing units derived from TFE and units (represented by the formula (U1-11)) and having an ion exchange capacity of 1.25 meq/g dry resin)), 475 g of ethanol and 316 g of water were leaded into a 2 L autoclave and stirred at 105° C. with a double helical impeller in a sealed state to obtain a homogeneous solution (solid content: 27.5 mass %).

(Cerium Compound)

Cerium carbonate octahydrate: Cerium (III) carbonate octahydrate, $Ce_2(CO_3)_3 \cdot 8H_2O$, manufactured by Wako Pure Chemical Industries, Ltd.

Cerium hydroxide: Cerium (IV) hydroxide, $CeO_2 \cdot nH_2O$, manufactured by Wako Pure Chemical Industries, Ltd.

(Reducing Agent)

Hydrogen peroxide: 35% Aqueous hydrogen peroxide for industrial use, manufactured by MITSUBISHI GAS CHEMICAL COMPANY, INC.

Acetaldehyde: Special grade reagent, manufactured by Wako Pure Chemical Industries, Ltd.

Formic acid: Special grade reagent, manufactured by Wako Pure Chemical Industries, Ltd.

(Ex. 1)

100 g of Fluoropolymer solution (S1), 0.5 of cerium carbonated octahydrate were put in a vial and stirred with a stirring bar, and the resulting solution was cloudy. The solution was irradiated with light from Light source (L1) placed at a distance of 5 cm from the surface of the solution, under stirring. The ultraviolet irradiance at the solution surface was 3.1 mW/cm$^2$. After 100 minutes of irradiation, the solution became clear, and the cerium (IV) hydroxide had dissolved. The turbidity of the liquid composition obtained was 0.5 NTU. The results are shown in Table 1. The amount of trivalent cerium ions was calculated from the amount of cerium carbonate octahydrate added and shown in equivalents relative to 100 equivalents of the sulfonic acid groups in the fluoropolymer calculated from the ion exchange capacity of S1 in the row titled $Ce^{3+}$ content in Table 1.

(Ex. 2 to 6)

Liquid compositions were prepared in the same manner as in Ex. 1 except that the kind and the amount of the fluoropolymer solution, the kind of the light source and the distance between the liquid source and the solution surface were changed as shown in Table 1. The results are shown in Table 1.

TABLE 1

|  |  | Ex. | | | | | |
| --- | --- | --- | --- | --- | --- | --- | --- |
|  |  | 1 | 2 | 3 | 4 | 5 | 6 |
| Fluoropolymer solution | Kind | S1 | S1 | S1 | S1 | S1 | S2 |
|  | Amount [g] | 100 | 100 | 100 | 100 | 10 | 100 |
| Cerium compound | Kind | Cerium carbonate octahydrate | Cerium carbonate octahydrate | Cerium carbonate octahydrate | Cerium hydroxide | Cerium carbonate octahydrate | Cerium carbonate octahydrate |
|  | Amount [g] | 0.5 | 0.5 | 0.5 | 0.14 | 0.05 | 0.43 |
|  | Cerium ion [ppm] | 2300 | 2300 | 2300 | 2300 | 2300 | 1950 |
|  | $Ce^{3+}$ content [eq] | 3.94 | 3.94 | 3.94 | 3.94 | 3.94 | 2.92 |
| State of solution |  | — | Cloudy | Cloudy | Cloudy | Cloudy | Cloudy and yellow | Cloudy |
| Light source | Kind | L1 | L2 | L3 | L2 | L1 | L2 |
| Distance between light source and solution surface | [cm] | 5 | 5 | 2 | 5 | 15 | 3 |
| Ultraviolet irradiance at the solution surface | [mW/cm$^2$] | 3.1 | 3.5 | 0.1 | 3.5 | 0.35 | 9.7 |

TABLE 1-continued

| | | Ex. | | | | | |
|---|---|---|---|---|---|---|---|
| | | 1 | 2 | 3 | 4 | 5 | 6 |
| Irradiation time | [min] | 100 | 18 | (10 days) | 18 | 3 | 18 |
| State of liquid composition | — | Clear | Clear | Clear | Clear | Clear | Clear |
| Turbidity of liquid composition | [NTU] | 0.5 | 0.5 | 0.5 | 0.5 | 0.5 | 0.3 |

In Ex. 1 to 6, because the ultraviolet irradiance at the solution surface was at least 0.1 mW/cm$^2$, the clouding of the solution with cerium (IV) hydroxide particles was eliminated in a relatively short time.

(Ex. 7)

100 g of Fluoropolymer solution (S1) and 0.5 g of cerium carbonate octahydrate were put in a vial, shielded from light with aluminum foil and stirred with a stirring bar, and the resulting solution was cloudy. Hydrogen peroxide was added to the solution to a concentration of 19 mol % relative to the elemental cerium (100 mol %) in the cerium compound, and the solution was stirred at room temperature with a stirring bar. In 90 hours after the addition of hydrogen peroxide, the solution became clear, and the cerium (IV) hydroxide dissolved. The turbidity of the liquid composition obtained was 0.5 NTU. The results are shown in Table 2.

(Ex. 8 to 17)

Liquid compositions were prepared in the same manner as in Ex. 7 except that the kind and the amount of the fluoropolymer solution, the kind of the cerium compound, the kind and amount of the reducing agent and the stirring time were changed as shown in Tables 2 and 3. The results are shown in Tables 2 and 3.

TABLE 2

| | | Ex. | | | | | |
|---|---|---|---|---|---|---|---|
| | | 7 | 8 | 9 | 10 | 11 | 12 |
| Fluoropolymer solution | Kind | S1 | S2 | S2 | S2 | S2 | S1 |
| | Amount [g] | 100 | 100 | 100 | 100 | 100 | 100 |
| Cerium compound | Kind | Cerium carbonate octahydrate | Cerium carbonate octahydrate | Cerium carbonate octahydrate | Cerium carbonate octahydrate | Cerium hydroxide | Cerium hydroxide |
| | Amount [g] | 0.5 | 0.43 | 0.43 | 0.43 | 0.14 | 0.12 |
| | Cerium ion [ppm] | 2300 | 1950 | 1950 | 1950 | 2300 | 1950 |
| | Ce$^{3+}$ content [eq] | 3.94 | 2.92 | 2.92 | 2.92 | 3.44 | 3.44 |
| State of solution | — | Cloudy | Cloudy | Cloudy | Cloudy | Cloudy and yellow | Cloudy and yellow |
| Light shielding | — | Shield | Shield | Shield | Shield | Shield | Shield |
| Reducing agent | Kind | Hydrogen peroxide | Hydrogen peroxide | Hydrogen peroxide | Hydrogen peroxide | Hydrogen peroxide | Hydrogen peroxide |
| | Added amount* [mol %] | 19 | 22 | 1.1 | 70 | 22 | 19 |
| Stirring time | [hour] | 90 | 90 | 150 | 30 | 90 | 100 |
| State of liquid composition | — | Clear | Clear | Clear | Clear | Clear | Clear |
| Turbidity of liquid composition | [NTU] | 0.5 | 0.5 | 0.5 | 0.5 | 0.5 | 0.5 |

*relative to the elemental cerium (100 mol %) in the cerium compound

TABLE 3

| | | Ex. | | | | |
|---|---|---|---|---|---|---|
| | | 13 | 14 | 15 | 16 | 17 |
| fluoropolymer | Kind | S2 | S1 | S1 | S2 | S2 |
| | Amount [g] | 100 | 100 | 100 | 100 | 100 |
| Cerium compound | Kind | Cerium hydroxide | Cerium carbonate octahydrate | Cerium carbonate octahydrate | Cerium carbonate octahydrate | Cerium hydroxide |
| | Amount [g] | 0.14 | 0.5 | 0.5 | 0.43 | 0.14 |
| | Cerium ion [ppm] | 2300 | 2300 | 2300 | 1950 | 2300 |
| | Ce$^{3+}$ content [eq] | 3.44 | 3.94 | 3.94 | 2.92 | 3.44 |
| State of solution | — | ~~Cloudy~~ and yellow | Cloudy | Cloudy | Cloudy | Cloudy |

TABLE 3-continued

| | | Ex. | | | | |
|---|---|---|---|---|---|---|
| | | 13 | 14 | 15 | 16 | 17 |
| Light shielding | — | Shield | Shield | Shield | Shield | Shield |
| Reducing agent | Kind | Acetaldehyde | Formic acid | — | — | — |
| | Added amount* [mol %] | 22 | 82 | — | — | — |
| Stirring time | [hour] | 200 | 300 | (1 month) | (1 month) | (1 month) |
| State of liquid composition | — | Clear | Clear | Cloudy | Cloudy | Cloudy and yellow |
| Turbidity of liquid composition | [NTU] | 0.5 | 0.5 | — | — | — |

*relative to the elemental cerium (100 mol %) in the cerium compound

In Ex. 7 to 14, because reducing agents were added, the clouding of the solution with cerium (IV) hydroxide particles was eliminated in a relatively short time.

In Ex. 15 to 17, because neither addition of a reducing agent nor irradiation with light was carried out, clouding with cerium (IV) hydroxide particles was not eliminated.

(Ex. 18)

100 g of Fluoropolymer solution (S3) and 0.46 g of cerium carbonate octahydrate were loaded into a 300 mL round-bottom glass flask and stirred with a polytetrafluoroethylene (PTFE) crescent blade at room temperature for 6 hours. Despite of formation of bubbles due to generation of $CO_2$ from the beginning of stirring, an almost clear solution A was obtained. Solution A had a solid content of 27.7 mass % and a turbidity of 1.5 NTU.

10 mass % aqueous hydrogen peroxide was added to Solution A to a concentration to 20 mol % relative to the elemental cerium (100 mol %) in the cerium compound, and after 2 hours of stirring at room temperature (23° C.), the solution had become clearer. The turbidity of the resulting liquid composition was measured and found to be 0.5 NTU.

The cerium ion content of the liquid composition was determined as follows.

The liquid composition was applied onto an ethylene-tetrafluoroethylene copolymer (ETFE) sheet (AFLEX 100N, manufactured by ASAHI GLASS CO., LTD., registered trademark), thickness: 100 μm) with a die coater and pre-dried at 80° C. for 10 minutes. Then, it was dried at 120° C. for 10 minutes and annealed at 150° C. for 30 minutes to obtain a polymer electrolyte membrane having a thickness of 50 μm. A specimen of 5 cm×5 cm in size was cut out from the polymer electrolyte membrane. The specimen was kept in dry nitrogen for 16 hours and weighed precisely. The specimen was immersed in 0.1 N aqueous HCl to thoroughly extract cerium ions into the liquid. The liquid extract was analyzed by ICP spectrometry to determine the cerium in the polymer electrolyte membrane. The amount of cerium ions was 1.5 mass % relative to the mass of the polymer electrolyte membrane, and the cerium ion content was 10 mol % relative to the sulfonic acid groups in the fluoropolymer.

Fluoropolymer solution (S3) was applied onto a 100 μm-thick ETFE sheet with a die coater, predried at 80° C. for 10 minutes, then dried at 120° C. for 10 minutes and annealed at 150° C. for 30 minutes to obtain a first polymer electrolyte membrane having a thickness of 25 μm.

Similarly, the above-mentioned liquid composition was applied onto a 100 μm-thick ETFE sheet with a die coater, predried at 80° C. for 10 minutes, then dried at 120° C. for 10 minutes and annealed at 150° C. for 30 minutes to obtain a second polymer electrolyte membrane having a thickness of 25 μm and a cerium ion content of 10 mol % relative to the sulfonic acid groups in the fluoropolymer.

The first polymer electrolyte membrane and the second polymer electrolyte membrane were hot-pressed at 150° C. to obtain a 50 μm-thick polymer electrolyte composite membrane having an uneven cerium ion content across its thickness.

(Ex. 19)

100 g of Fluoropolymer solution (S4) and 0.52 g of cerium carbonate octahydrate were loaded into a 300 mL round-bottom glass flask and stirred with a PTFE crescent blade at room temperature for 6 hours. Despite of formation of bubbles due to generation of $CO_2$ from the beginning of stirring, a pale yellow or almost clear solution B was obtained. Solution B had a solid content of 27.7 mass % and a turbidity of 40 NTU.

10 mass % aqueous hydrogen peroxide was added to Solution B to a concentration to 4.5 mol % relative to the elemental cerium (100 mol %) in the cerium compound, and after 2 hours of stirring at room temperature (23° C.) with a stirring bar, the solution had become clearer. The turbidity of the resulting liquid composition was measured and found to be 0.5 NTU.

(Ex. 20)

100 g of Fluoropolymer solution (S4) and 1.03 g of cerium carbonate octahydrate were loaded into a 300 mL round-bottom glass flask and stirred with a PTFE crescent blade at room temperature for 6 hours. Despite of formation of bubbles due to generation of $CO_2$ from the beginning of stirring, a pale yellow or almost clear solution B was obtained. Solution B had a solid content of 27.7 mass % and a turbidity of 100 NTU.

10 mass % aqueous hydrogen peroxide was added to Solution B to a concentration to 8.9 mol % relative to the elemental cerium (100 mol %) in the cerium compound, and after 5 hours of stirring at room temperature (23° C.) with a stirring bar, the solution had become clearer. The turbidity of the resulting liquid composition was measured and found to be 0.5 NTU.

INDUSTRIAL APPLICABILITY

A liquid composition obtained by the method of the present invention is useful as a material to be used for forming polymer electrolyte membranes and catalyst layers of polymer electrolyte fuel cells.

This application is a continuation of PCT Application No. PCT/JP2016/060956, filed on Apr. 1, 2016, which is based upon and claims the benefit of priority from Japanese Patent Application No. 2015-077515 filed on Apr. 6, 2015. The contents of those applications are incorporated herein by reference in their entireties.

REFERENCE SYMBOLS

10: membrane/electrode assembly, 11: catalyst layer, 12: gas diffusion layer, 13: anode, 14: cathode, 15: polymer electrolyte membrane, 16: carbon layer

What is claimed is:

1. A method for producing a liquid composition containing a fluoropolymer having sulfonic acid groups, trivalent cerium ions and water, the method comprising adding a reducing agent to a solution containing at least one cerium compound selected from the group consisting of cerium carbonate, cerium hydroxide and cerium oxide, the fluoropolymer, the water, and cerium (IV) formed from mixing the at least one cerium compound and water,
   wherein the reducing agent is at least one member selected from the group consisting of hydrogen peroxide, acetaldehyde, and formic acid; and
   wherein said reducing agent is added to the solution to reduce cerium (IV) to trivalent cerium ions.

2. The method for producing a liquid composition according to claim 1, wherein the reducing agent is added in an amount of from 0.47 to 90 mol % relative to elemental cerium (100 mol %) in the cerium compound.

3. The method for producing a liquid composition according to claim 1, wherein a content of the fluoropolymer having sulfonic acid groups in the liquid composition (100 mass %) is from 1 to 50 mass %.

4. The method for producing a liquid composition according to claim 1, wherein a content of the water in the liquid composition (100 mass %) is from 20 to 60 mass %.

5. The method for producing a liquid composition according to claim 1, wherein a content of trivalent cerium ions is from 1.6 to 23.3 equivalents relative to the sulfonic acid groups in the fluoropolymer (100 equivalents).

6. The method for producing a liquid composition according to claim 1, wherein the liquid composition further contains an organic solvent having a hydroxyl group.

7. The method for producing a liquid composition according to claim 6, wherein a proportion of the organic solvent having a hydroxyl group to a sum of the water and the organic solvent having a hydroxyl group (100 mass %) is from 1 to 90 mass %.

8. A method for producing a polymer electrolyte membrane for a polymer electrolyte fuel cell, which comprises obtaining a liquid composition by the method as defined in claim 1, and then forming a polymer electrolyte membrane for a polymer electrolyte fuel cell by using the liquid composition.

* * * * *